United States Patent [19]

Taki et al.

[11] Patent Number: 4,880,340
[45] Date of Patent: Nov. 14, 1989

[54] SCREW CUTTER DIE HEAD

[75] Inventors: Naohiro Taki, Kohnan; Yasuhiro Ozawa, Kasugai, both of Japan

[73] Assignee: Asada Kabushiki Kaisha, Aichi, Japan

[21] Appl. No.: 222,691

[22] Filed: Jul. 21, 1988

[30] Foreign Application Priority Data

Jul. 22, 1987 [JP] Japan ................. 62-112304

[51] Int. Cl.$^4$ ............................................. B23G 5/12
[52] U.S. Cl. ..................... 408/176; 10/96 R; 10/120.5 R; 408/149; 408/177
[58] Field of Search ............... 10/94, 96 R, 96 T, 97, 10/102, 120, 120.5 R, 120.5 AD; 408/148, 149, 175, 176, 177

[56] References Cited

U.S. PATENT DOCUMENTS

| 576,924 | 2/1987 | Wagner | 408/175 |
| 896,711 | 8/1908 | Church | 408/148 |
| 948,394 | 2/1910 | Hoefer | 10/120.5 R |
| 962,184 | 6/1910 | Wells | 10/120.5 R |
| 1,146,871 | 7/1915 | Hart | 408/176 |
| 1,844,419 | 2/1932 | Borden | 10/120.5 R |
| 2,855,611 | 10/1958 | Bjalme | 408/176 |
| 4,288,181 | 9/1981 | Sakaguchi et al. | 408/149 X |

Primary Examiner—E. Michael Combs
Attorney, Agent, or Firm—Sughrue, Mion, Zinn, Macpeak & Seas

[57] ABSTRACT

A screw cutter die head comprising an annular body portion, a ring member formed with several cam ridges and angularly movable relative thereto and several chasers held by said body member to be radially movable by engagement of a cam recess formed in each chaser with each of said cam ridges is in public knowledge. When it is necessary to process the work of far larger or smaller diameter in the known die head, the chasers must be exchanged with the others formed with the cam recess nearer to the cutting edges or more apart therefrom. The invention provides the chasers formed with a plurality of recesses and the ring member formed with the corresponding number of notches to be engaged with the latch for fixing it.

2 Claims, 4 Drawing Sheets 4,880,340

SCREW CUTTER DIE HEAD

BACKGROUND OF THE INVENTION

The patent application relates to a device for cutting external threads in the peripheral outer surface of an elongated cylindrical work, such as a pipe, rod etc. and more particularly to a screw cutter die head.

There are various methods or means for cutting screw threads on such work, such as lathe, die, die head, thread milling and thread grinding, each of which has respective advantages and disadvantages.

The method using a die having cutting edges on an inner peripheral wall thereof is advantageously simple in construction but disadvantageous particularly in that when a desired length of thread has been formed along the extended work the die must be rotated in the other direction to remove the die from the work, and in that the central opening thereof for the work to pass through is not variable, so that the tool must be changed each time depending on the varied outer diameter of the work.

Different therefrom, the so-called die head which generally has four or five chasers circumferentially mounted thereon to be radially movable in the central opening towards the circle center or in the other direction, allows the work to be removed therefrom without necessity of reverse rotation, because the chasers may be simultaneously retracted in the respective radial directions when the necessary screw cutting is over.

The die head generally comprises an annular body portion holding said chasers to be radially movable, an annular support member fixed thereto and a ring member having a corresponding number of circle arc cam ridges formed on one side surface thereof and adapted to be angularly movable between and relative to said annular body portion and annular support member, all of which have a central opening for the elongated cylindrical work to pass therethrough to be formed with external threads by multiple cutting edges formed at the inner ends of said chasers.

Each of said chasers has a recess to ride on each of said cam ridges extended to be in a circle arc and arranged to be inclined with respect to a circumference passing through a center point in the length thereof so that when the ring member is angularly moved relative to the assembly of said annular body portion and said annular support member in either direction, each of said chasers may respectively slide along each of the slantedly arranged cam ridges to be radially moved in the corresponding direction to be in the position where the cutting edges of each of the chasers may engage with the peripheral surface of the work for screw cutting or in the other or retracted position where the chasers are no longer engaged with the work so as to allow said work to be freely removed from the die head.

As well known to those skilled in the art, the elongated cylindrical work such as pipes and rods to be formed with external thread have respective diameters stepwisedly varied, i.e. increased or decreased in such a manner as predetermined by the govermental standard or manufacturers' agreement, according to which said angularly movable ring is rotated, and then fixed so as not to be angularly moved more, generally by fitting a latch held on the annular body portion of the die head in any corresponding one of a plurality of notches or recesses formed in said rotatable ring member around the outer peripheral wall in pitches corresponding to those of the stepwisedly varied diameter of the work so that the inner ends of the chasers may proceed with necessary screw cutting of the work having the corresponding outer diameter. Then, a chuck holding the elongated cylindrical work for rotation and the die head is relatively moved together in the axial direction so as to actually proceed with screw cutting. The die head, thus, may cope with the works having various diameters in a range to be decided by the number of the notches or recesses to be engaged with the latch and the inclination angle of the cam ridge to be engaged with the cam recess formed in the chaser.

The die head is generally formed with a pivoted detector so that when the external thread is cut along a predetermined length of the work, the free end of the elongated work may abut thereon to cause mechanical action for automatically disengaging said fixation of the angularly movable ring from the die head so as to allow release of the work.

The die head of the art referred to above is already in public knowledge e.g. from Japanese Official Gazette Sho No. 57 (1982)-20101 of Apr. 26, 1982 for opening the examined Patent Application filed by Asada Kabushiki Kaisha designated as the assignee of the present patent application to be laid open to public inspection.

There is, however, a limit to the range of varied diameters of the work with which the die head of the type referred to above can cope. The number of the notches to be formed around the angularly movable ring is to be limited in an arc angle corresponding to that of the arc cam ridge, because even if the notch number is increased and consequently even if the arc angle along which the notches are formed is increased, the chase is to be disengaged from the cam ridge so as not to radially move. It is obviously difficult to make the arc cam ridge to be slanted so sharply. In order to proceed with screw cutting on further larger or smaller diameter of the work, thus, the chasers must be exchanged with new ones in each of which the cam recess is formed at a location nearer to the inner end or the outer end thereof.

Thus, one object of the invention is to provide a die head capable of coping with a wider range of varied diameters of the elongated cylindrical work to be formed with external thread without necessity of changing the chasers each time.

The object referred to above can be attained by using the chaser formed with a plurality of cam recesses and forming the corresponding number of groups of the notches or recesses to engage with the latch for fixing the angularly movable ring member relative to the die head.

The invention will be explained in more detail with respect to a preferred embodiment with reference to the accompanying drawings.

DETAILED DESCRIPTION OF THE PREFERRED EMBODIMENT

Figure 1:
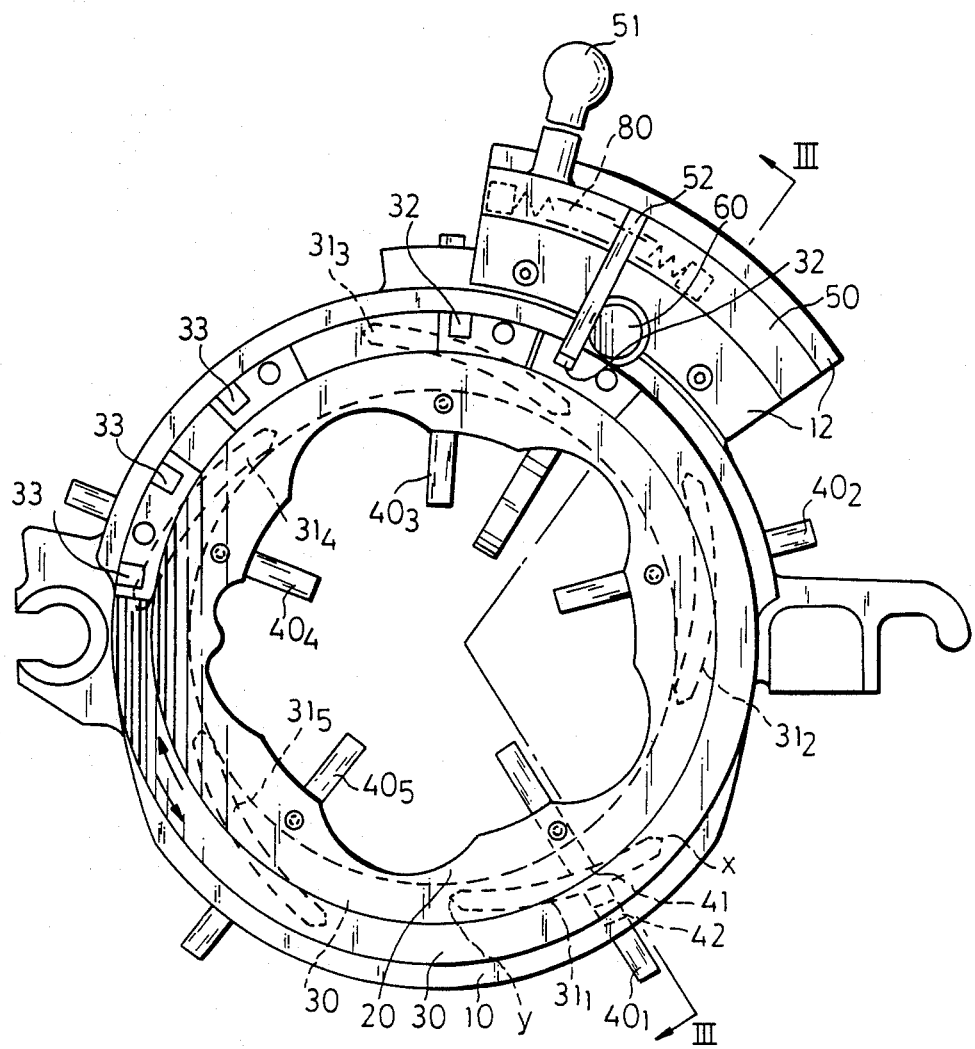
FIG. 1 is a front view of the die head of the screw cutter to which a plurality of (5) chasers according to the invention are mounted.
Figure 2:
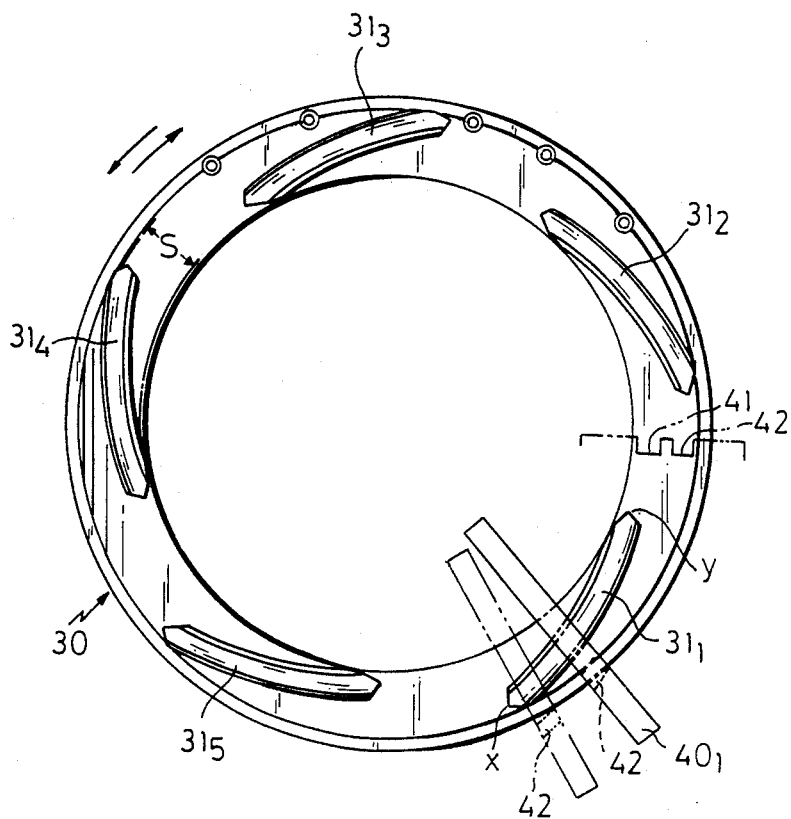
FIG. 2 is a rear view of an angularly movable ring member having a corresponding number of (5) arcuate cam ridges formed on the rear side surface thereof, each for guiding each of said chasers to radially move in either direction.
Figure 3:
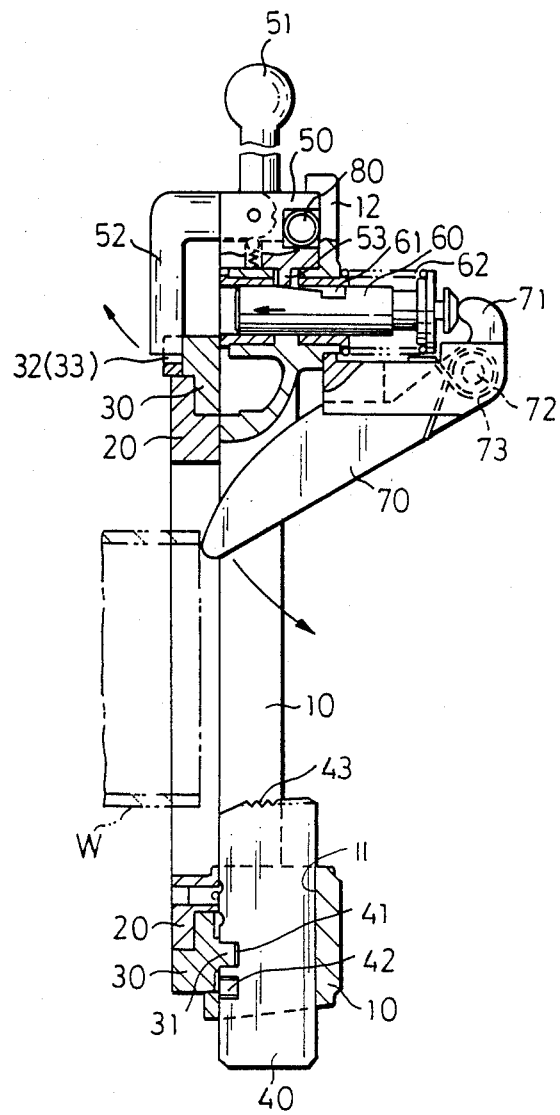
FIG. 3 is a side elevation of said cutting head partly in section taken along a line III—III and seen in arrows in FIG. 1.

In reference to FIGS. 1 to 3, a cutting head of the screw cutter comprises an annular body portion 10, an annular support member 20 fixed thereto and a ring member 30 relatively angularly movable therebetween, all of which have a central opening for an elongated cylindrical work W (e.g. pipe) shown in phantom lines in FIG. 3.

The annular body portion 10 is formed with a plurality of (5 in the illustrated embodiment) radial grooves 11 open at the front side thereof and with leaving equal space between any adjacent two so that each of the chasers held thereby may contact the rear side of the ring member 30 and move slidingly therein in so out in a radial direction.

The angularly movable ring 30 has a corresponding number of (5 in the illustrated embodiment) circular arc cam ridges 31 on the rear side surface thereof, each of which is inclined relative to a circle circumference passing through the center in the length so that one end x lies outside thereof while the other end y lies inside thereof.

Figure 4:
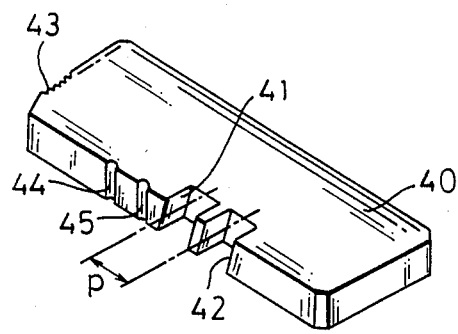
FIG. 4 is a perspective view of a chaser having a plurality of (2) cam recesses, either one of which is engaged with the concerned cam ridge.

Each of said chasers 40 has a plurality of (2 in the illustrated embodiment) recesses 41, 42 spaced apart by a distance p which corresponds to an inclination S of the cam ridge 31 or a distance S by which the chaser 40 may radially move as best shown in FIG. 4 (see also FIG. 2), each of which may fit on the concerned cam ridge 31 so that when the ring member 30 is angularly moved in either direction relative to the body portion 10 holding the chasers 40 respectively in the radial grooves 11, every chaser 40 may be radially moved in unison correspondingly in either direction. It is noted here that in FIGS. 1, 2 and 3, the first cam recess 41 formed near to the inner end where multiple cutting edges 43 are formed is engaged with the cam ridge 31 for screw cutting a group of the works W of relatively larger diameters, but in FIG. 5B the engagement is changed over to the second cam recess 42 for screw cutting the other group of the works W having a relatively smaller diameters.

In the illustrated embodiment, when the ring member 30 is rotated in the clockwise direction in FIG. 1, the chasers 40 are radially moved outwards to be in the retracted position, but when rotated in the counter-clockwise direction in FIG. 1, the chaser 40 are radially slided relatively and along the respective cam ridges 31 to be in the screw cutting position. In FIG. 2 the relation referred to above is to be naturally reversed.

In case where the two cam recesses 41, 42 are formed in every chaser 40, correspondingly two groups of recesses 32, 33 are formed around the outer peripheral surface of the ring member 30. The first group of recesses 32 are related to the inner cam recess 41 for screw cutting of relatively larger diameters of the pipes W, while the second group of recesses 33 are related to the outer cam recess 42 for relatively smaller diameters of pipes W. If three cam recesses are formed in every chaser 40, three groups of recesses are to be formed around the circumferential wall of the angularly movable ring member 30.

Mainly in reference to FIGS. 1 and 3, above all the latter, the body portion 10 has a sector guide member 12 fixed thereto which guides a correspondingly sectoral member 50 movable relatively thereto, which has a handle 51 and a pivotally mounted and radially extended latch 52 to be engaged with any of said recesses 32, 33 for fixing the rotatable sectoral member 50 relatively thereto to be an angularly movable assembly.

As best shown in FIG. 3, the latch 52 is held in this position by virtue of a click engagement of notches and a ball elastically urged to be fitted therein, so that when the latch 52 is angularly moved in the clockwise direction in the drawing (see an arrow given in the corresponding portion thereof), the free end thereof may be disengaged from the concerned recess 32 (33) and held by another notch engaged with the elastically urged ball, which disengages the rotatable sectoral member 50 from the angularly movable ring member 30.

The rotatable sectoral member 50 has a downwardly protruded portion 53 and an axially extended groove in which an axially extended cylindrical member 60 has a notch 16 which engaged said protrusion 53 and thus holds the member 50 in the position shown in FIG. 3 by spring means 62. In this position said protrusion 53 and consequently the sectoral member 50 are urged upwardly so that the rotatable sectoral member 50 cannot be rotated relative to the stationary guide member 12 owing to the frictional engagement therebetween. When said cylindrical member 60 is pushed to the left side as shown by an arrow in FIG. 3 against the force of said spring means 62, said protrusion 53 fits in said notch 61 so that the frictional engagement is released and thus the sectoral member 50 and consequently the ring member 30 engaged therewith by virtue of the latch 52-recess 32 (33) engagement can be angularly moved relative to the die head (10 and 20).

On the die head or the body portion 10, there is mounted a detector level 70 rotatable about a pin 72 and urged in the position by a spring means 73 so that normally one end of said level 70 abuts the free end of the pipe W set to be going to be subjected to screw cutting while the other end of the lever abuts one end of said cylindrical member. Thus, when the pipe W is formed with the external thread along a predetermined length, said detector level 70 is angularly moved in a counter-clockwise direction shown by an arrow given in FIG. 3 so as to push the cylindrical member 60 towards the left side in this figure as referred to above.

There is provided further compression spring means 80 between the rotatable sectoral member 50 and the sector guide member 12 so as to be in the compressed state as shown in FIG. 1 but when the frictional engagement therebetween is disengaged as referred to above, the sectoral member 50 engaged with the ring member 30 is angularly moved to an angular position e.g. a few decades of degrees in clockwise direction from the shown angular position.

Now in operation, after the preceding screw cutting operation is over and before the die head is set for new screw cutting of the new work W of a different diameter, the sectoral member 60 and the ring member 30 engaged together by means of the latch 52 and any of the recess 32 (33) are in the position just referred to above. Firstly the latch 52 is manually disengaged from the recess as referred to above, and then the ring member 30 is manually rotated from said normal angular position, preferably by actuating a level (not shown) fixed thereto, to the standard position shown in FIG. 1 in order to screw cut the pipe W of the largest diameter in the group of the relatively larger diameter pipes. If the secondly large diameter of pipe W should be process, the ring member 30 should be rotated so that the second recess 32 occupies said position. Of course more than two recesses 32 may be formed depending on the industrial standard or agreement on the pipe diameter.

Nextly the sectoral member 50 is manually rotated by actuating the handle 51 against the force of the compression spring 80 so that the latch 52 is brought to the position where said first recess 32 for the largest diameter pipe of the ring member is set to be engaged therewith. Thereby the chasers 40 engaging with the respective counterpart cam ridges 31 with the inner recess 41, which is for processing the group of larger diameter pipes W, are radially moved in unison to be in the screw cutting position. What should be done next, is only to move the chuck holding the pipe W to be rotated relative to the die head, generally move the latter towards the former.

As the screw cutting progresses, the detector lever 70 abutting on the free end of the pipe W is angularly moved against the force of the spring 73 to push the cylindrical member 60 against the force of the spring 62. When a predetermined external thread is formed, and thus when the protrusion 53 of the sectoral member 50 drops into the notch 61, the frictional engagement between the stationary sector guide member 12 and the assembly consisting of angularly movable sectoral member 50 and the angularly movable ring member 30 is released so that the assembly is angularly moved back to the initial position owing to the compressed spring 80. Thereby the cam ridges 31 formed on the ring member 30 guide the chasers 40 having the respective cam recesses 41 respectively engaging therewith to be in their retracted position in unison.

If the new pipe W of the smallest diameter in the group of the smaller diameter pipes is to be subjected to next screw cutting, the latch 52 is manually disengaged again from the first recess 32 and the ring member 30 is manually rotated so that the third recess 33 may occupy the angular position which said first recess 32 had occupied. Then the sectoral member 50 is manually rotated against the force of the spring 80 to said angular position against so as to engage the latch 52 this time with said third recess 33. Of course more than three recesses 33 may be formed depending on the circumstance.

Figure 5A:
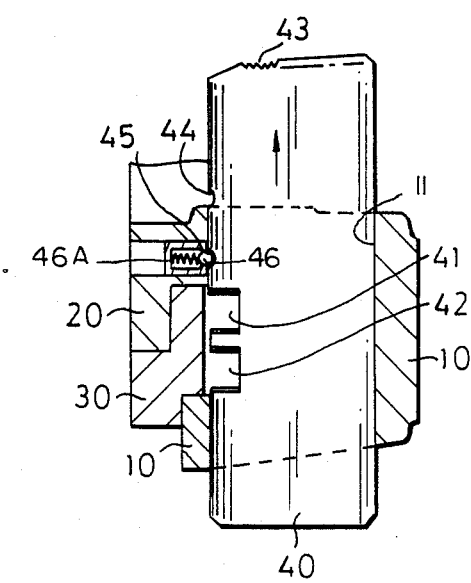
FIGS. 5A and 5B are respectively side elevations of the chaser and side sections of a portion of the die head where the chaser is held, which corresponds to the lower portion in FIG. 3 respectively in a larger scale, in different positions.
Figure 5B:
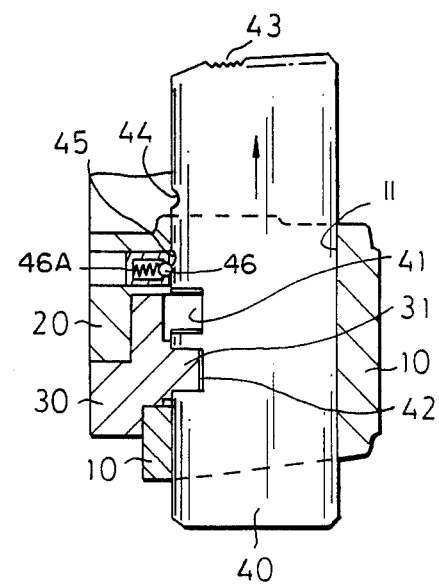

When the ring member 30 is rotated as just referred to above, e.g. the first chase 40, rotates relative to the ring member in the counter-clockwise direction in FIG. 2 to pass over the cam ridge 31, with which the first cam recess 41 thereof has engaged until now. The recesses 41 and 42 of this chaser 40, are shown by phantom lines in the state where the chaser is turned by 90° merely for the purpose of readily understanding the engagement of the cam ridge and the cam recess. As the angular movement of the ring member 30 progresses, the chaser 40 goes to relatively ride on the next cam ridge $31_2$ not with the inner recess 41 until now but with the outer recess 42 for processing the group of smaller diameters of pipes. FIG. 5A shows the state where the chaser 40 lies between the adjacent two cam ridges and FIG. 5B shows the state where the engagement has been changed from the recess 41 to the recess 42. In both FIG. 5A and 5B, a ball 46 is urged by a spring 46A toward one of the notches 44, 45. The ball 46 is one of a plurality of balls in the ring member 30. This keeps the chaser 40 from getting off the groove at the position where the chaser just gets free of the cam ridge 31.

What is to be made then is screw cutting.

It is clear from the above that the invention makes it possible to carry out screw cut of the works W of the varied diameters the range of which is made two or more times diameters the range of which is made two or more times without necessity of exchanging the chasers in comparison with the usual die head of the art referred to above.

What is claimed is;

1. A screw cutter die head from with a center opening for an elongated cylindrical work, comprising:
    an annular body portion having a plurality of radial grooves;
    a ring member angularly movable relatively thereto and formed with a corresponding number of arcuate cam ridges on the side surface faced to said body portion, each of said arcuate cam ridges being helically arranged and slanted with respect to a circle passing through the center of a circumference thereof;
    a corresponding number of chasers respectively having a plurality of cam recesses formed therealong and spaced apart by a predetermined distance corresponding to an inclination of the respective cam ridges so as to engage with each of said cam ridges, said chasers being held in said grooves so as to be radially movable between a screw cutting position and a retracted position in unison when said ring member is angularly moved,
    each two adjacent cam ridges being spaced apart along said circumference of said circle by a distance in which a respective chaser is freed from either of said adjacent ridges;
    said die head further comprising a plurality of balls, provided in said ring member and urged so as to protrude therefrom, said balls engaging respective first notches formed on respective ones of said chasers in response to said chasers being freed from a respective cam ridge so as to prevent said chasers from escaping said radial grooves and retain the chasers at the point where they are just free of the cam ridges;
    such that in response to rotation of said ring member in a first direction, the cam ridges engage cam recesses of associated chasers encountered in rotation in said first direction, and, in response to rotation of said ring member in a second, opposite direction, the cam ridges engage cam recesses of associated chasers encountered in rotation in said second direction.

2. A screw cutter die head according to claim 1, wherein said ring member is formed with a corresponding number of groups of second notches around a peripheral wall thereof, and a latch for engaging one of said second notches so as to fix the ring member and prevent angular movement thereof, positioning of said chasers in different ones of said second notches enabling said screw cutter die head to hold workpieces of different diameter, so that when it is necessary to form screw cuts in said workpieces of different diameters, said ring members rotates so as to engage the chaser to the next cam ridge with the next cam recess thereof.

* * * * *